United States Patent
Schultz

(10) Patent No.: US 9,550,917 B1
(45) Date of Patent: Jan. 24, 2017

(54) AQUEOUS POLISHING SLURRY

(71) Applicant: Turtle Wax, Inc., Willowbrook, IL (US)

(72) Inventor: Michael A. Schultz, Homer Glen, IL (US)

(73) Assignee: Turtle Wax, Inc., Addison, IL (US)

( * ) Notice: Subject to any disclaimer, the term of this patent is extended or adjusted under 35 U.S.C. 154(b) by 0 days.

(21) Appl. No.: 14/974,411

(22) Filed: Dec. 18, 2015

(51) Int. Cl.
*C09G 1/02* (2006.01)

(52) U.S. Cl.
CPC ...................................... *C09G 1/02* (2013.01)

(58) Field of Classification Search
CPC ............... C09G 1/02; C09G 1/04; C09G 1/14; C09G 1/16; C09G 1/18; C09K 3/1463
See application file for complete search history.

(56) References Cited

U.S. PATENT DOCUMENTS

| | | | |
|---|---|---|---|
| 4,013,475 A | | 3/1977 | Liebowitz et al. |
| 4,457,856 A | * | 7/1984 | Mitchell ................ B65D 35/44 510/236 |
| 5,866,532 A | | 2/1999 | Jackson et al. |
| 6,506,715 B1 | * | 1/2003 | Schultz ..................... C11D 1/02 106/14.31 |
| 2012/0258904 A1 | * | 10/2012 | Bjelopavlic ........... C11D 3/3707 510/397 |
| 2014/0352721 A1 | | 12/2014 | Gonzales et al. |

FOREIGN PATENT DOCUMENTS

| | | | |
|---|---|---|---|
| EP | 0159923 A1 | * | 10/1985 |
| EP | 1158033 A1 | | 11/2001 |
| EP | 1167481 A1 | | 1/2002 |
| EP | 1541653 A1 | * | 6/2005 |
| EP | 1939260 A2 | | 7/2008 |
| WO | WO01/31110 | | 5/2001 |
| WO | WO2005/076801 A2 | | 8/2005 |

OTHER PUBLICATIONS

Wacker Silicones Car Polish LP 62.
Flick, E., Advanced Cleaning Product Formulations, 1999, p. 180, vol. 5, William Andrew Publishing LLC, New York.
Heckl, S., Abrasives Essential Components of Polishing and Cleaning Agents, 2008, Hoffmann Mineral, Neuburg, Germany.

* cited by examiner

*Primary Examiner* — Anthony J Green
(74) *Attorney, Agent, or Firm* — Olson & Cepuritis, Ltd.

(57) ABSTRACT

An aqueous polishing slurry having enhanced wettability comprises a detergent blend which includes an anionic alkyl sulfate-based detergent and an alkylbenzene sulfonate detergent together with particulate polishing abrasive.

18 Claims, No Drawings

AQUEOUS POLISHING SLURRY

FIELD OF INVENTION

This invention relates to car products. More particularly, this invention relates to polishing slurries for automotive finishes.

BACKGROUND OF INVENTION

It is desirable to keep exposed hard surfaces of automobiles clean and polished, as well as to minimize surface tarnishing. To that end, a wide variety of compositions is commercially available. Inorganic polishing agents/abrasives due to their desired particle size for mechanically producing gloss on automotive finishes or remove stains and scratches, can contaminate surrounding or hard to reach areas, however. Abrasive concentration and current dispersion chemistries in finished product do not prevent the adhesion of unsightly residual materials to porous paint, plastic and other automotive materials. Porous plastic and rubber automotive absorb polish/abrasive materials embedding them below the surface plastic making them difficult or impossible to remove. Usually a white residue remains in paint scratches, chips, and on plastic and rubber trim of vehicles. The present liquid polishing composition obviates the aforesaid shortcoming of traditional liquid polishing compositions, and can be applied easily by hand or a power buffing device, as desired.

SUMMARY OF INVENTION

An alkaline aqueous polishing slurry embodying the present invention provides enhanced wettability to a surface to be polished and contains a detergent blend comprising an anionic alkyl sulfate detergent and an anionic alkylbenzene sulfonate detergent, together with particulate polishing abrasive such as aluminum silicate and the like. After polishing, remnants of the slurry can be rinsed off a polished surface with water without leaving a visible residue. The slurry is free from silicones and waxes, and has a viscosity in the range of about 1 to 70 centipoises, preferably about 1 to about 10 centipoises, at 70° F. The aqueous polishing slurry applied to an automotive finish provides a wettable surface on which a stationary drop of deionized water exhibits a static contact angle of no more than about 20 degrees, preferably less, after one minute equilibration.

A preferred aqueous polishing slurry includes, in addition to the detergent blend and particulate polishing abrasive, also a petroleum based liquid and an anionic thickening agent.

DESCRIPTION OF PREFERRED EMBODIMENTS

The present aqueous polishing slurries are particularly well suited for polishing automotive finishes. These slurries can be applied by hand or a power-driven polishing device and enhance wettability of the finish. Because of hygroscopicity of the detergents present, the applied slurry can remain on the painted surface for an extended time period without drying out, thus minimizing the likelihood of marring or burning the painted surface. The applied slurry also does not leave a residue in paint scratches or chips, on intricate surfaces, or on plastic and rubber trim of an automobile, but can be readily rinsed off with water leaving the finish free of unsightly residues. When power driven polishing devices such as rotary buffers are utilized, the present polishing slurries minimize sling, thereby saving time during vehicle preparation and final cleanup.

As used herein and in the appended claims, the term "wettability" means the ability of a solid surface to reduce the surface tension of a liquid in contact with it such that it spreads over the surface and wets it.

A quantitative indicator of wetting of a solid surface by the liquid is the contact angle formed by a drop of liquid on the solid surface. Contact angles can be divided into static and dynamic contact angles. Static contact angles are measured when a liquid drop is standing on the surface, and the solid-liquid-gas boundary of the liquid drop is not moving. Dynamic contact angles are measured when the solid-liquid-gas boundary of the liquid drop is not stationary, i.e., is moving.

As used herein and in the appended claims, the term "static contact angle" means the angle formed by a stationary drop (sessile) of deionized water on a treated smooth, flat steel plate with base coat/clear coat (BC/CC) automotive finish after one minute equilibration. Low contact angle values indicate that the liquid spreads readily on the surface while high contact angle values indicate poor spreading. Complete wetting of a surface by the liquid is represented by a contact angle value of zero degrees.

The main constituents of preferred aqueous polishing slurries are a detergent blend comprising an anionic alkyl sulfate detergent and a linear, anionic alkylbenzene sulfonate detergent, a polishing abrasive, a petroleum based liquid, a thickener, and water. Viscosities of these slurries preferably are in the range of about 1 to about 70 centipoises, more preferably about 1 to 10 centipoises at 70° F.

To produce the detergent blend suitable anionic alkyl sulfate detergents are the alkyl sulfates such as sodium dodecyl sulfate sodium tallow sulfate, potassium dodecyl sulfate, magnesium dodecyl sulfate, sodium octyl sulfate, and the like.

Suitable anionic alkylbenzene sulfonate detergents are the linear, $C_{10}$-$C_{15}$ alkylbenzene sulfonic acids such as dodecylbenzene sulfonic acid, tridecylbenzene sulfonic acid, undecylbenzene sulfonic acid, $C_{10}$-$C_{13}$ alkylbenzene sulfonic acid, and the like, as well as the alkali metal salts thereof such as sodium dodecylbenzene sulfonate, and the like.

The aqueous polishing slurries are alkaline. Thus, when an alkylbenzene sulfonic acid is utilized as one of the detergents in the detergent blend, the hydroxyl groups present will neutralize in situ the alkylbenzene sulfonic acid present to the corresponding alkylbenzene sulfonate.

The mol ratio of the alkyl sulfate and the alkylbenzene sulfonate in the detergent blend preferably is in the range of about 6:1 to about 6.25:1, respectively.

The polishing slurry contains the detergent blend in an amount in the range of about 3 to 7 percent by weight, preferably about 5 percent by weight, based on the weight of the slurry.

Suitable particulate polishing abrasives are aluminum silicate, e.g., calcined Kaolin clay, aluminum oxide, and the like, preferably having a mean particle size no greater than about 2.5 microns, more preferably having a mean particle size of about 1 micron.

The amount of particulate polishing abrasive in the present polishing slurries is in the range of about 5 to about 25 percent, preferably about 10 to about 15 percent, by weight, based on the weight of the slurry.

Suitable petroleum based liquids are petroleum distillates such as liquid aliphatic hydrocarbons, mineral oil, mixtures thereof, and the like. Preferably, the petroleum based liquid comprises at least about 10 percent by weight of a relatively low vapor pressure aliphatic hydrocarbon, e.g., exhibiting a vapor pressure of not more than 0.1 mm Hg at 68° F. (20° C.). In some preferred embodiments, the petroleum based liquid comprises about 80 percent by weight of the low vapor pressure aliphatic hydrocarbon having a flash point of about 200° F. (93° C.) and about 20 percent by weight of mineral oil having a flash point of about 469° F. (243° C.). The amount of petroleum based liquid present in the polishing slurry preferably is in the range of about 10 to about 15 percent by weight of the slurry, more preferably about 12 percent by weight of the slurry.

Suitable thickeners are anionic cross-linked acrylic acid homopolymers, and the like thickening agents. The thickener can be present in the polishing slurry in an amount in the range of about 0.1 to about 0.4 percent by weight, preferably about 0.2 to about 0.3 percent by weight, based on the total weight of the slurry.

Optionally, the polishing slurry can contain cleaning agents such as alkali metal hydroxides, e.g., sodium hydroxide, potassium hydroxide, and the like, in some instances together with a fatty acid such as oleic acid, to form a soap.

Optionally, the polishing slurry can contain a humectant such as glycerol, and an anti-microbial such as 1,2-benzisothiazolin-3-one, and the like, and a fungicide such as morpholine, and the like.

The present polishing slurries are alkaline, exhibiting a pH value up to about 11, preferably a pH value in the range of about 8 to about 9, more preferably about 8.5. The pH value of the polishing slurry can be adjusted by addition of an alkali metal hydroxide, such as sodium hydroxide, or morpholine.

The polishing slurries are compounded by combining the various constituents to form a slurry by methods well known in the art. Preferably, a major portion of the desired amount of water is first combined in a mixing vessel, with agitation, with the anionic alkyl sulfate detergent, a thickener, and an aliquot of an aqueous solution of an alkali metal hydroxide sufficient to provide a thickened slurry having an alkaline value. Thereafter the petroleum based liquid and the particulate polishing abrasive are stirred into the thickened slurry, optionally together with additives such as a humectant, oleic acid, morpholine, and the like, followed by the addition of an antimicrobial compound. The resulting admixture is stirred until substantially uniform. Thereafter, more water is added, with stirring, together with the alkylbenzene sulfonate detergent to provide a polishing slurry having a desired solids content.

Example 1

Aqueous Polishing Slurry

A polishing slurry was prepared by combining the following components.

Cold soft water (45 parts by weight), sodium lauryl sulfate (17.5 parts by weight; STEPANOL WA EXTRA[1], 29% active solution), anionic cross-linked acrylic acid homopolymer (0.25 parts by weight; CARBOPOL EZ-3[2]), and caustic soda liquid (0.15 parts by weight; 50% NaOH) were combined in a mixing vessel with agitation. Thereafter, to the resulting admixture were added calcined Kaolin (12 parts by weight; KAOPOLITE 1168[3]), liquid aliphatic hydrocarbon having a flash point of 200° F. (93° C.) (10 parts by weight; CALPRINT 35[4]), glycerol (3 parts by weight; 96% U.S.P.), mineral oil having a flash point of 465° F. (243° C.) (2 parts by weight; #70 White Mineral Oil[5]), oleic acid (0.8 parts by weight; PRIOLENE 6905[6]), and morpholine (0.7 parts by weight) with continued agitation until the added constituents were distributed thoroughly and a substantially homogenous slurry was obtained. A 20% aqueous dipropylene glycol solution of 1,2-benzisothiazolin-3-one (0.15 parts by weight; PROXEL GXL[7]) was added to the slurry, followed by dodecylbenzene sulfonic acid (1 part by weight; BIO-SOFT 100[1]) and additional water (7.8 parts by weight) while the slurry was stirred continuously to produce a substantially homogenous polishing slurry.

[1]Stepan Company, Northfield, Ill. 60093.
[2]Lubrizol Advanced Materials, Inc. Cleveland, Ohio 44141.
[3]Fitz Chem Corporation, Itasca, Ill. 60143.
[4]Calumet Specialty Products Partners, L.P., Indianapolis, Ind. 46214.
[5]Calumet Penreco, LLC, Karns City, Pa. 16041.
[6]Uniqema, Paterson, N.J. 07544
[7]Arch Chemicals, Inc. Smyrna, Ga. 30080.

Example 2

Wettability Evaluation

The polishing slurry produced as described in Example 1 was evaluated for wettability as described below.

Test Materials:

Flat 3"×9" inch flat steel panels painted with a OEM equivalent BC/CC automotive finishes with a normal water resistance that display a contact angle between 80 to 95 degrees. A contact angle was determined by measuring the tangent angle of a deionized water droplet at the point of contact on the test substrate. 0.1 mL water droplet was placed in the center of a clean panel and allowed to dwell for one minute. The contact angle was then determined using an optical comparator. The contact angle must be within the 80-90 degrees.

Test:

Qualifying panels were then used for polish and product testing. One-half ounce of product was applied with a 100% cotton cloth (3"×3") and rubbed with firm finger pressure back and forth for 20 cycles, simulating hand application on the BC/CC automotive finish. The residual polish was left to dry. A de-ionized water droplet (0.1 ml) was placed in the center of the test area. The droplet was allowed to dwell on the panel for one minute. An optical comparator was used to determine the contact angle. Contact angles of the polishing slurry of Example 1 of the present invention displayed a contact angle of less than 18 degrees.

Example 3

Performance Evaluation

The polishing performance of the polishing slurry produced as described in Example 1 was evaluated as described below.

The polishing slurry, having a milky white appearance, was applied with a power buffer to a door panel of a black Lincoln Town Car sedan showing surface scratches. The panel was buffed with the polishing slurry for about three minutes. The panel was then rinsed with water. The rinse water flowed from the buffed surface without beading, presenting a polished, dry surface without any visible residue remaining in the scratched portions of the door panel.

The foregoing specification and examples are intended as illustrative, and are not to be construed as limiting. Still other variants within the spirit and scope of the described invention will readily present themselves to those skilled in the art.

I claim:

1. An alkaline aqueous polishing slurry for automotive finishes, free from silicones and waxes, which comprises an anionic alkyl sulfate detergent, an anionic alkylbenzene sulfonate detergent, a petroleum based liquid, particulate polishing abrasive having a mean particle size of no greater than about 2.5 microns, and water; said slurry having a viscosity in the range of about 1 to about 70 centipoises at 70° F.

2. An aqueous polishing slurry, for automotive finishes, free from silicones and waxes, which comprises
an anionic alkyl sulfate detergent;
an anionic alkylbenzene sulfonate detergent;
a particulate polishing abrasive;
a petroleum based liquid;
a thickening agent; and
water;
whereby said slurry, when applied to an automotive finish, provides a wettable surface on which a stationary drop of deionized water exhibits a static contact angle of no more than about 20 degrees after one minute equilibration.

3. The aqueous polishing slurry in accordance with claim 2 wherein said anionic alkyl sulfate detergent is sodium lauryl sulfate, and said anionic alkylbenzene sulfonate detergent is dodecylbenzene sulfonic acid.

4. The aqueous polishing slurry in accordance with claim 2 wherein the anionic alkyl sulfate detergent and the anionic alkylbenzene sulfonate detergent are present in a respective mol ratio of about 6:1 to about 6.25:1.

5. The aqueous polishing slurry in accordance with claim 2 wherein the total amount of the anionic alkyl sulfate detergent and the anionic alkylbenzene sulfonate detergent present in the slurry is in the range of about 3 to about 7 percent by weight, based on the weight of the slurry.

6. The aqueous polishing slurry in accordance with claim 2 wherein the total amount of the anionic alkyl sulfate based detergent and the anionic alkylbenzene sulfonate detergent present in the slurry is about 5 percent by weight, based on the total weight of the slurry.

7. The aqueous polishing slurry in accordance with claim 2 wherein the petroleum based liquid is a mixture of petroleum distillates.

8. The aqueous polishing slurry in accordance with claim 7 wherein the mixture comprises liquid aliphatic hydrocarbon having a vapor pressure of not more than about 0.1 mm Hg at 68° F. and mineral oil having a flash point of about 469° F.

9. The aqueous polishing slurry in accordance with claim 2 wherein the thickening agent is an anionic, cross-linked acrylic acid homopolymer.

10. The aqueous polishing slurry in accordance with claim 2 wherein the polishing abrasive is calcined Kaolin clay.

11. The aqueous polishing slurry in accordance with claim 2 wherein the polishing abrasive is aluminum oxide.

12. An aqueous alkaline automotive polishing slurry, free from silicones and waxes, which comprises
a blend of an anionic alkyl sulfate detergent and an anionic alkylbenzene sulfonate detergent;
a particulate polishing abrasive;
a petroleum based liquid;
a thickening agent; and
water;
said anionic alkyl sulfate detergent and said anionic aklylbenzene sulfonate detergent being present in said blend in a mol ratio of about 6:1 to about 6.25:1, respectively;
said detergent blend being present in said slurry in the range of about 3 to about 7 percent by weight;
said particulate polishing abrasive having a mean particle size no greater than about 2.5 microns and being present in said slurry in an amount in the range of about 5 to about 25 percent by weight, based on the weight of the slurry;
said petroleum based liquid being present in said slurry in an amount in the range of about 10 to about 15 percent by weight of the slurry;
said thickening agent being present in said slurry in an amount in the range of about 0.1 to about 0.4 percent by weight;
said slurry having a viscosity in the range of about 1 to about 70 centipoises at 70° F., a pH value in the range of about 8 to about 9, and providing a wettable surface, when applied to an automotive finish, on which a stationary drop of deionized water exhibits a contact angle of no more than about 20 degrees after one minute equilibration.

13. The aqueous alkaline automotive polishing slurry in accordance with claim 12 wherein the blend of detergents consists of sodium lauryl sulfate and sodium dodecylbenzene sulfonate.

14. The aqueous alkaline automotive polishing slurry in accordance with claim 12 wherein the particulate polishing abrasive is calcined Kaolin clay.

15. The aqueous alkaline automotive polishing slurry in accordance with claim 12 wherein the petroleum based liquid is a mixture of petroleum distillates comprising about 80 percent by weight liquid aliphatic hydrocarbon having a vapor pressure of no more than about 0.1 mm Hg at 68° F. and about 20 percent by weight mineral oil having a flash point of about 469° F.

16. The aqueous alkaline automotive polishing slurry in accordance with claim 12 wherein the thickening agent is an anionic, cross-linked acrylic acid homopolymer.

17. The aqueous alkaline automotive polishing slurry in accordance with claim 12 further comprising an alkali metal hydroxide and a fatty acid.

18. The aqueous alkaline automotive polishing slurry in accordance with claim 17 wherein the alkali metal hydroxide is sodium hydroxide and the fatty acid is oleic acid.

* * * * *